US009683898B2

(12) United States Patent
Sundaramoorthy et al.

(10) Patent No.: US 9,683,898 B2
(45) Date of Patent: Jun. 20, 2017

(54) METHOD AND APPARATUS FOR DETERMINING AN ACTUAL JUNCTION TEMPERATURE OF AN IGBT DEVICE

(71) Applicant: ABB Technology AG, Zurich (CH)

(72) Inventors: Vinoth Sundaramoorthy, Wettingen (CH); Enea Bianda, Baden (CH); Richard Bloch, Oberarth (CH); Iulian Nistor, Niederweningen (CH); Gerold Knapp, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/078,588

(22) Filed: Mar. 23, 2016

(65) Prior Publication Data

US 2016/0313191 A1 Oct. 27, 2016

Related U.S. Application Data

(63) Continuation of application No. PCT/EP2014/070376, filed on Sep. 24, 2014.

(30) Foreign Application Priority Data

Sep. 24, 2013 (EP) ..................... 13185653

(51) Int. Cl.
*G01K 7/00* (2006.01)
*G01K 7/01* (2006.01)

(52) U.S. Cl.
CPC ..................... *G01K 7/01* (2013.01)

(58) Field of Classification Search
USPC ................................. 374/178, 170
See application file for complete search history.

(56) References Cited

U.S. PATENT DOCUMENTS

| 6,097,582 | A | 8/2000 | John et al. |
| 2013/0177041 | A1 | 7/2013 | Sundaramoorthy et al. |
| 2016/0187207 | A1* | 6/2016 | Li ..................... G05F 3/02 |
| | | | 374/1 |

FOREIGN PATENT DOCUMENTS

WO 2013045960 4/2013

OTHER PUBLICATIONS

Huang et al., IGBT Fault Protection Based on di/dt Feedback Control, Power Electronics Specialists Conference, Jun. 17, 2007, 7 pages.

(Continued)

*Primary Examiner* — Mirellys Jagan
(74) *Attorney, Agent, or Firm* — Taft Stettinius & Hollister

(57) ABSTRACT

The present invention relates to a method for determining an actual junction temperature ($T_j$) and/or an actual collector current ($I_C$) of an IGBT device, wherein the IGBT device has a main emitter ($E_M$) and an auxiliary emitter ($E_A$), comprising the steps of;

measuring the characteristics of an emitter voltage drop ($V_{EE'}$) as a difference between a main emitter voltage ($V_E$) at the main emitter ($E_M$) and an auxiliary emitter voltage ($V_{E'}$) at the auxiliary emitter ($E_A$) during a switching operation of the IGBT device; and determining the junction temperature and/or the collector current ($I_C$) based on the characteristics of the emitter voltage drop ($V_{EE'}$).

19 Claims, 5 Drawing Sheets

(56) References Cited

OTHER PUBLICATIONS

Motto et al., IGBT Module with User Accessible On-Chip Current and Temperature Sensors, Applied Power Electronics Conference and Exposition, Feb. 5, 2012, 6 pages.
European Search Report, 13185653.6, ABB Technology AG, Jun. 13, 2014.
International Search Report and Written Opinion, PCT/EP2014/070376, ABB Technology AG, Dec. 12, 2014.

\* cited by examiner

METHOD AND APPARATUS FOR DETERMINING AN ACTUAL JUNCTION TEMPERATURE OF AN IGBT DEVICE

TECHNICAL FIELD

The present invention relates to methods for determining an actual junction temperature of an IGBT device.

RELATED ART

A junction temperature of an IGBT semiconductor device in power applications is an important parameter for estimating the remaining lifetime of the IGBT device since the junction temperature provides essential information about the aging of such a device. Hence, the accurate estimation of the junction temperature becomes significant in estimating the remaining lifetime of an IGBT device and of an IGBT module including one or more IGBT devices.

As the junction temperature depends on operating conditions of the IGBT device and becomes highly dependent on the switching current, a number of approaches for measuring the load current of the IGBT device during operation, such as a Rogowski coil, current transformers and the like, have been made. However, these types of sensors are bulky and do not provide a practical approach to obtain an indication about the load current of the IGBT device.

Other techniques for measuring the junction temperature of the IGBT device may include mounting a thermocouple inside the packaged IGBT device or close thereto or measuring the internal gate resistance on the IGBT device. These techniques either involve direct access to the device or require specially designed IGBT chips or devices.

Hence, the above techniques are not well-suited for online measurement of the junction temperature of IGBT devices, particularly if there is a need for a timely resolution of the measurement to be in the range of several hundreds of Hz or several kHz. These measurement frequency correspond to the level of a PWM frequency (PWM: pulse width modulation) with which IGBT devices in many applications are operated.

As techniques requiring a manipulation of the IGBT device itself or additional components to be closely arranged at the IGBT device are costly and complex to implement, it is an object to provide a method and an apparatus for estimating a junction temperature from a direct measurement of electrical characteristics of the IGBT device. Furthermore, it is an object to provide a method for simultaneously estimating an IGBT current and a junction temperature for the same time instance.

U.S. Pat. No. 6,097,582A1 discloses a protection circuit for a power semiconductor switching device with a gate terminal controlling the current flow between power terminals of the device. The current through the device is estimated by integrating the voltage across an inductance in the current flow path of the device and providing a fault signal if the estimated current exceeds a selected value. The gate terminal is limited to a selected control level intermediate the full-on and full-off current levels of the switching device when the fault signal is provided. The current through the IGBT is measured based on the voltage drop between the power emitter terminal and the Kelvin emitter terminal of the device.

WO2013045960A2 discloses a method for measuring a silicon temperature of a power insulated gate bipolar transistors which is performed by measuring threshold voltage at turning on, which linearly decreases as the transistor silicon temperature increases, wherein the moment, at which the voltage between the gate and the control emitter corresponds to the threshold voltage, is determined by voltage detection between the control and power connections of the emitter.

SUMMARY OF THE INVENTION

These objects have been achieved by the method for determining an actual junction temperature of an IGBT device according to claim 1 and by the apparatus according to the further independent claim.

Further embodiments are indicated in the depending subclaims.

According to a first aspect, a method for determining an actual junction temperature of an IGBT device is provided, wherein the IGBT device has a main emitter and an auxiliary emitter. The method comprises the steps of:
 measuring the characteristics of an emitter voltage drop as a difference between a main emitter voltage at the main emitter and an auxiliary emitter voltage at the auxiliary emitter during a switching operation of the IGBT device; and
 determining the junction temperature based on the characteristics of the emitter voltage drop,
 wherein the junction temperature may be determined by the steps of:
 assigning a reference peak voltage of the emitter voltage drop during the switching operation to a provided collector emitter voltage of the IGBT device and a determined collector current, wherein the reference peak voltage corresponds to a peak voltage of the emitter voltage drop during a switching operation at a reference temperature;
 determining a peak voltage of the emitter voltage drop during the switching operation; and
 determining the actual junction temperature depending on the determined peak voltage and the reference peak voltage.

One basic idea of the above method is to estimate a junction temperature depending on an emitter voltage drop between a main emitter voltage and an auxiliary emitter voltage of the IGBT device. Normally, the emitter terminals of the IGBT device are split into the power emitter of the main emitter that is connected to the power circuit and the auxiliary emitter (or Kelvin emitter) that is connected to the gate drive unit. Due to the bonding wires and the terminal fittings, the internal connections of the IGBT device cause parasitic inductances between the main emitter terminal and the auxiliary emitter terminal of the IGBT device. During a switching operation of the IGBT device, there is an emitter voltage drop across the parasitic inductance between the emitter terminals which can be used for estimating both the junction temperature. In particular, the emitter voltage drop between the main and auxiliary emitter terminals during a switching operation provides voltage characteristics having a peak voltage which depends on the junction temperature and an integral of the characteristics of the emitter voltage drop during switching which depends on a collector current.

This method allows for an estimation of the junction temperature by means of a direct measurement of electrical characteristics of the IGBT device. This allows for calculating the remaining lifetime of the IGBT device by detecting the power cycles of the semiconductor. Furthermore, a system health check can be performed during factory testing and during operation, so that preventive maintenance can be carried out.

Also, the actual junction temperature can be used to implement temperature protection for the IGBT device. Furthermore, when using the IGBT devices in converter design, it is possible to reduce the margins which were necessary when measuring the junction temperature with a delay or with measurement tolerance.

Moreover, the collector current may be determined based on an integration of the emitter voltage drop over time during the switching operation.

According to an embodiment, assigning the reference peak voltage may be performed by a provided lookup function determining a relation between peak voltages at reference temperatures and collector currents.

The peak voltage of the emitter voltage drop may be determined during the switching operation by loading a memory capacitance with a load current proportional to the emitter voltage drop and providing the memory capacitance voltage as an indication of the peak voltage.

The actual junction temperature may be determined depending on a peak voltage difference between the determined peak voltage and the reference peak voltage and a sensitivity of the characteristics of the peak voltage over junction temperature of the IGBT device.

According to a further aspect, an apparatus for determining an actual junction temperature and/or an actual collector current of an IGBT device is provided, wherein the IGBT device has a main emitter and an auxiliary emitter, wherein:
  means are provided for measuring the characteristics of an emitter voltage drop as a difference between a main emitter voltage at the main emitter and an auxiliary emitter voltage at the auxiliary emitter during a switching operation of the IGBT device; and
  means are provided for determining the junction temperature and/or the collector current based on the characteristics of the emitter voltage drop. The apparatus may further comprise:
  a first lookup function block for assigning a reference peak voltage of the emitter voltage drop during the switching operation to a provided collector emitter voltage of the IGBT device and a determined collector current, wherein the reference peak voltage corresponds to a peak voltage of the emitter voltage drop during a switching operation at a reference temperature; and
  a second lookup function block for determining the actual junction temperature depending on the determined peak voltage and the reference peak voltage.

A peak voltage detector may be provided for determining a peak voltage of the emitter voltage drop during the switching operation.

An integrator may be provided which is configured to determine the collector current based on an integration of the emitter voltage drop over time during the switching operation.

BRIEF DESCRIPTION OF THE DRAWINGS

Embodiments are described in more detail in conjunction with the accompanying drawings, in which.

DESCRIPTION OF EMBODIMENTS

Figure 1:
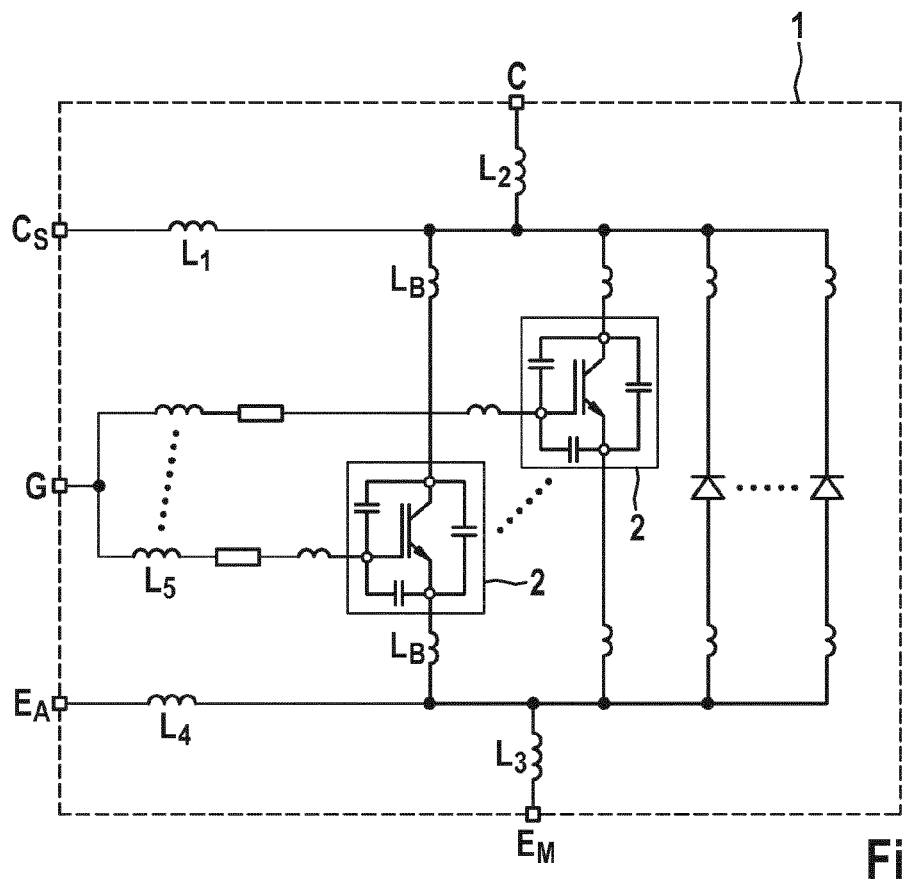
FIG. 1 shows a schematic view of an IGBT module having two parallel connected IGBT devices.

FIG. 1 shows a schematic of an IGBT module 1 for use in power applications. The IGBT module 1 comprises one or more IGBT devices 2 which are connected in parallel. Each of the IGBT devices 2 is integrally formed as a semiconductor chip and comprises an IGBT semiconductor component as known in the art.

The terminals of the IGBT module 1 are: an insulated gate G, a main collector C, a sense collector $C_S$, a main emitter $E_M$ and an auxiliary emitter $E_A$, each of which is connected to the respective internal terminal of the IGBT device 2, so that the terminals of the module behave like common terminals for all of the included IGBT devices 2. Although, substantially, the IGBT is a three-terminal power semiconductor device in many applications, the auxiliary emitter $E_A$ may be fed out to a separate external terminal. While the main emitter $E_M$ is connected to the power circuit and is part of the power path, the auxiliary emitter $E_A$ may be connected to a gate drive unit (not shown).

Internal connections in the IGBT module 1 result in parasitic inductances $L_1$ to $L_5$, $L_B$, wherein the sense collector $C_S$ is provided with the parasitic inductance $L_1$, the power path of the main collector C is provided with the parasitic inductance $L_2$, the power path of the main emitter $E_M$ is provided with the parasitic inductance $L_3$, the auxiliary emitter $E_A$ is provided with the parasitic inductance $L_4$, the gate is provided with the parasitic inductance $L_5$, and the internal terminals of the IGBT chip are provided with bonding parasitic inductances $L_B$. Hence, there are parasitic inductances $L_3$ and $L_4$ between the main emitter $E_M$ and the auxiliary emitter $E_A$ which are caused by terminal configurations. Over the main collector C and the main emitter $E_M$, a DC link voltage $V_{DC}$ may be applied.

Between the auxiliary emitter $E_A$ and the main emitter $E_M$, an emitter voltage drop $V_{EE'}$ can be observed which occurs during a switching operation of the IGBT device 2. This emitter voltage drop $V_{EE'}$ shows characteristics which depend on the junction temperature, the collector current $I_C$ and the collector emitter voltage $V_{DC}$. Therefore, the parasitic inductance between the auxiliary emitter $E_A$ and the main emitter $E_M$ can be used as a sensor to extract the current flowing through the IGBT device 2 and its junction temperature. The derivative of the collector current $I_C$ flowing through this parasitic inductance generates a voltage drop given by $$V_{EE'} = L_\sigma \frac{dI_C}{dt},$$

where $V_{EE'}$ corresponds to the emitter voltage drop measured between the auxiliary emitter $E_A$ and the main emitter $E_M$, $L_\sigma$ corresponds to the parasitic inductance across which the voltage drop is measured (e. g. $L_3$, as $dI_C/dt$ occurs only through $L_3$, and $L_4$ sees only gate current), and $I_C$ corresponds to the collector current.

Figure 2:
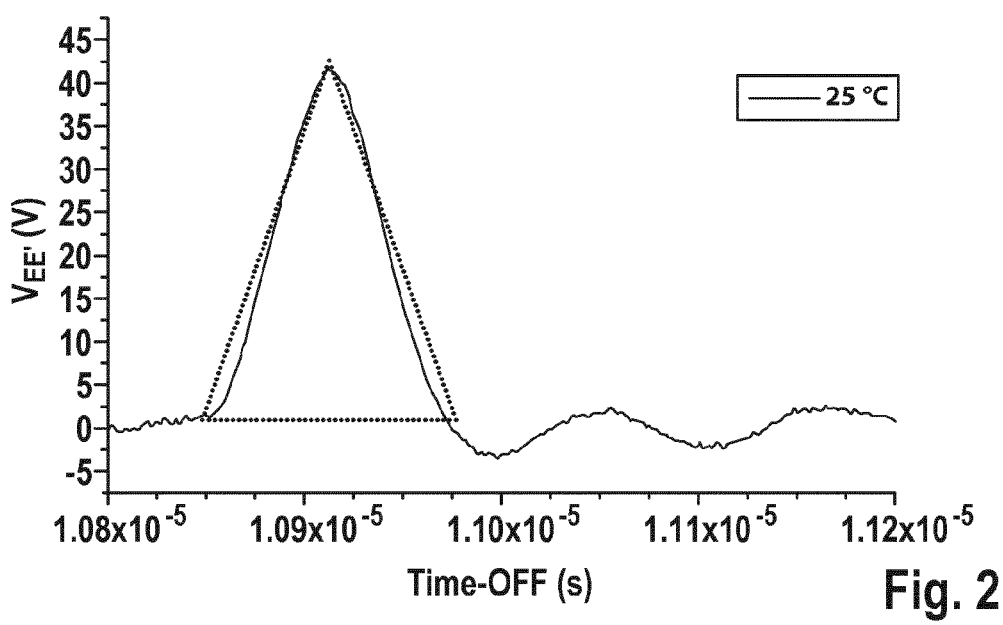
FIG. 2 shows a voltage-time diagram of the emitter voltage drop between a main emitter and an auxiliary emitter of an IGBT device during a switching operation at 25° C.

FIG. 2 illustrates the characteristics of the voltage drop $V_{EE'}$ over time during a switching operation while the collector current $I_C$ can be obtained by:

$$I_C = \frac{1}{L_\sigma} \int V_{EE'} \, dt,$$

which is indicated by the dotted line triangle.

The voltage difference between the auxiliary emitter voltage $V_{E'}$ and the main emitter voltage $V_E$, when measured at different temperatures, results in different peak voltages during the switching operations. The difference of the peak voltages at a particular collector current $I_C$ is used as an indicator for the junction temperature of the IGBT device 2.

Figure 3:
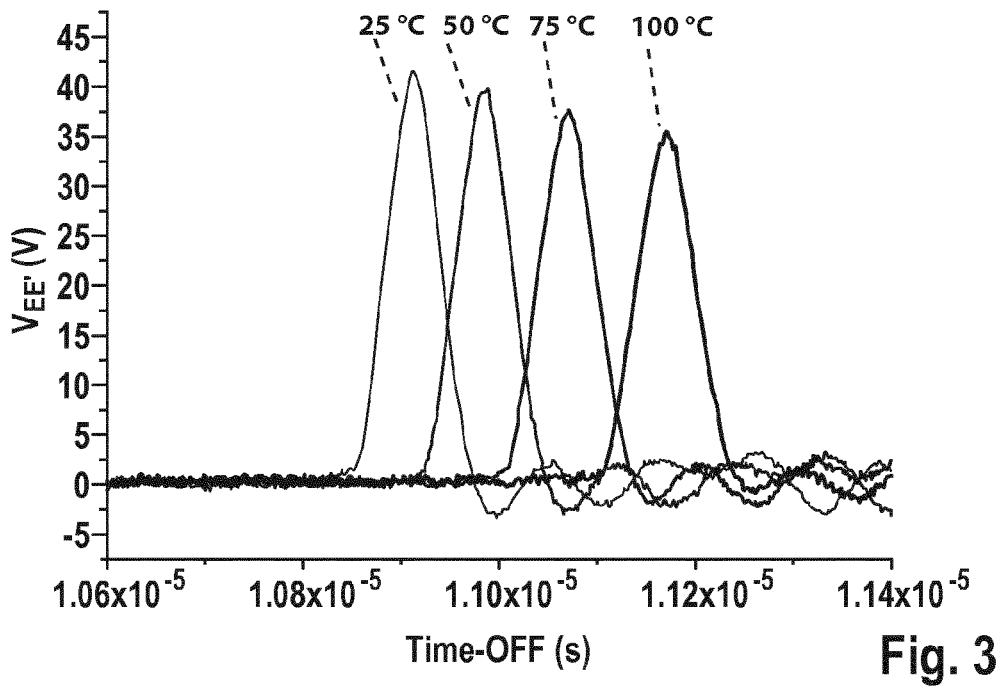
FIG. 3 shows a voltage-time diagram of the emitter voltage drop between a main emitter and an auxiliary emitter of an IGBT device during a switching operation for different junction temperatures.

In FIG. 3, it can be seen that the peak voltages of the emitter voltage drop $V_{EE'}$ decrease over increasing junction temperatures. However, the area of the curve at each measurement temperature remains constant as the different curves get wider with increasing temperatures. Hence, the switching collector current $I_C$ should remain approximately the same at all junction temperatures in this measurement condition. Since the measured parasitic inductance is constant over temperature, the change of the peak voltages of the emitter voltage drop $V_{EE'}$ at different temperatures should be due to the change of $dI_C/dt$ over temperature. The term $dI_C/dT$ decreases with temperature as the device mobility is decreasing at higher temperatures and the IGBT device 2 gets slower in switching.

The sensitivity of the peak voltage of the emitter voltage drop $V_{EE'}$ is substantially linear over the junction temperature, so that a peak voltage measured at an unknown junction temperature can be used to determine the actual junction temperature $T_j$ of the IGBT device 2 by comparing the peak voltage at the unknown junction temperature with a peak voltage at a reference junction temperature, such as at 25° C. Hence the unknown temperature can be estimated by comparing the value of the peak voltage of the emitter voltage drop $V_{EE'}$ for different currents and voltages at the reference junction temperature and the peak voltage obtained at a similar current and voltage for an unknown temperature.

Figure 4:
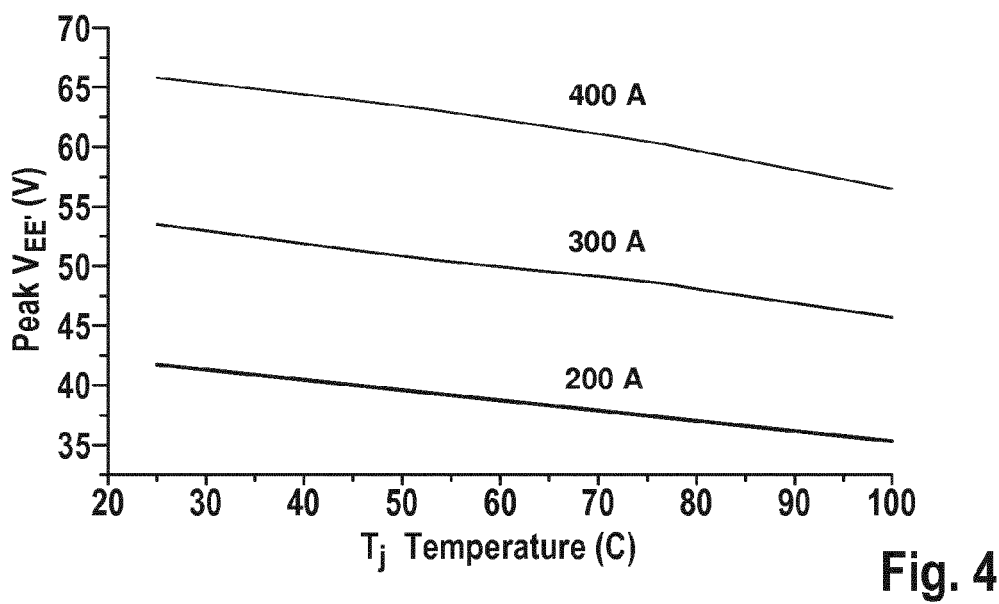
FIG. 4 shows a diagram indicating the characteristics of the peak voltage of the emitter voltage drop over junction temperature for different collector currents.

In FIG. 4, the characteristics of the peak voltage of the emitter voltage drop $V_{EE'}$ over temperature are illustrated for different collector currents $I_C$. It can be seen that the variation of the peak voltage decreases over temperature and increases with the switching current at all measurement temperatures.

Figure 5:
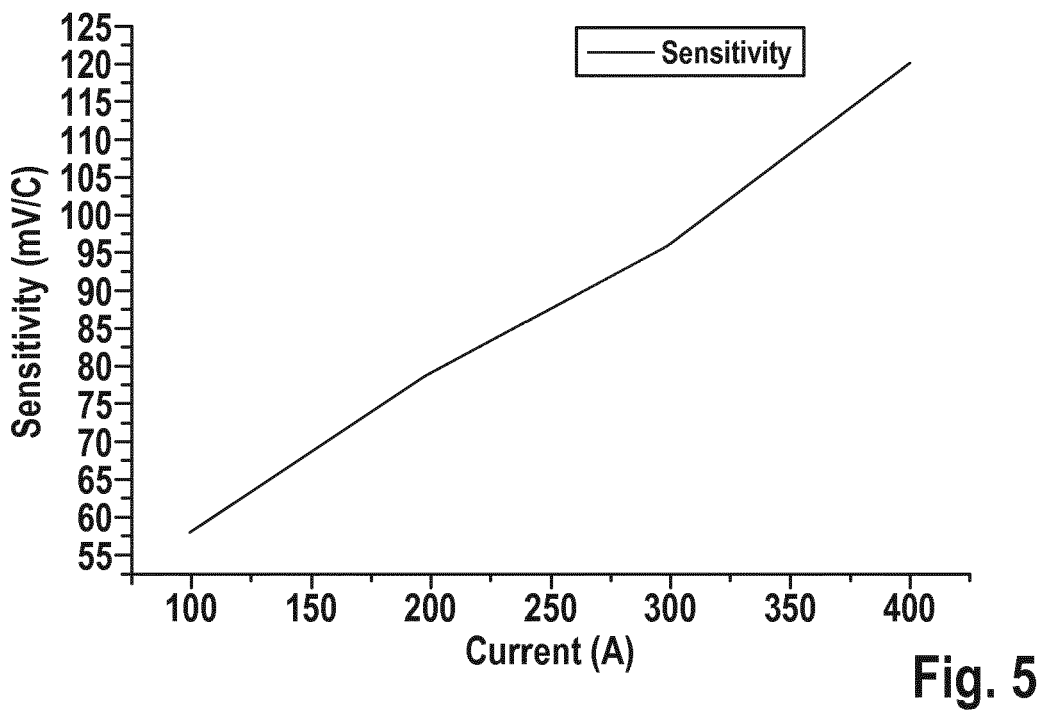
FIG. 5 shows the variation of a junction temperature sensitivity of the peak voltage as a function of the switching current.

As further shown in FIG. 5, the variation of the temperature sensitivity of the peak voltage as a function of the switching current increases with the collector current $I_C$ for a particular device. Hence, the collector current $I_C$ has to be known in order to extract the actual junction temperature $T_j$ using the peak voltage.

Figure 6:
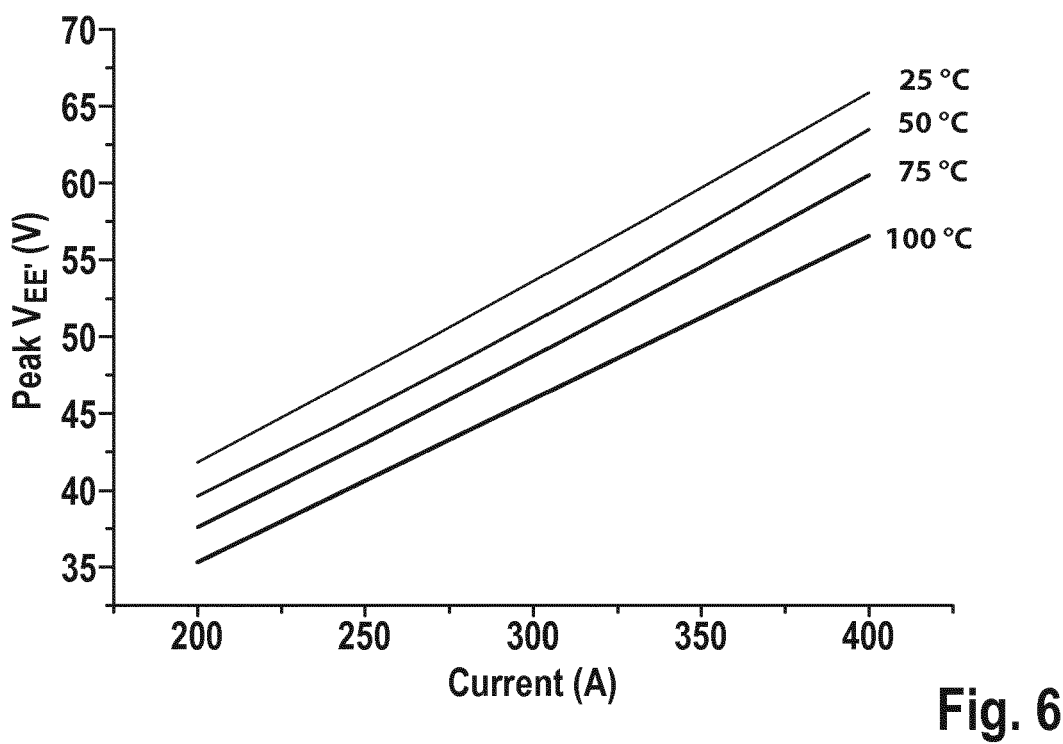
FIG. 6 shows a diagram indicating the characteristics of the peak voltage over the collector current for different junction temperatures.

Furthermore, it can be seen from FIG. 6 that the peak voltage of the emitter voltage drop $V_{EE'}$ increases with the switching current at any given temperature. Also, the peak voltage is higher for the lowest temperature at any given collector current $I_C$.

Figure 7:
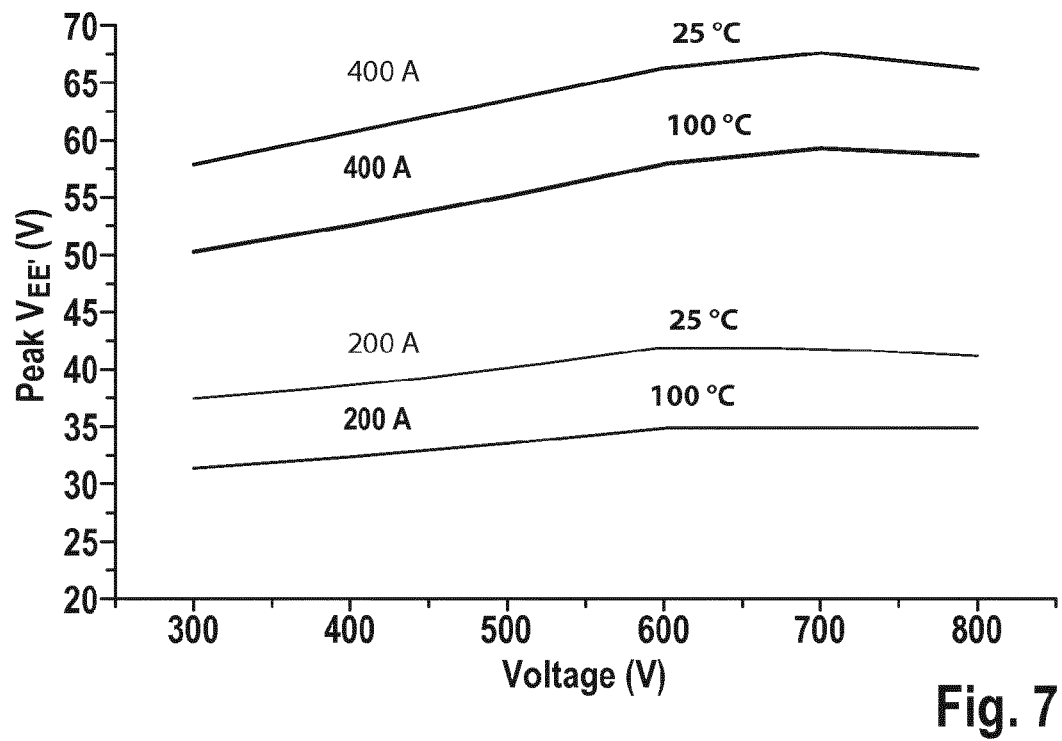
FIG. 7 shows a variation of the peak voltage of the emitter voltage drop over a collector emitter voltage for two different junction temperatures of 25° C. and 100° C. and two currents of 200 A and 400 A.

A variation of the peak voltage of the emitter voltage drop $V_{EE'}$ over a collector emitter voltage $V_{DC}$ for two different junction temperatures of 25° C. and 100° C. and two currents of 200 A and 400 A is shown in FIG. 7. It can be seen that at any given collector current $I_C$ and junction temperature, the peak voltage increases up to a certain voltage and then either remains constant or decreases slightly thereafter, depending on measurement temperature and switching current. Generally, it can be seen that the sensitivity of the peak voltage over the collector emitter voltage $V_{DC}$ is higher at higher switching currents for any given temperature. Hence, both collector current $I_C$ and the collector emitter voltage as the DC link voltage $V_{DC}$ have has to be known in order to extract the actual junction temperature $T_j$ using the peak voltage.

Figure 8:
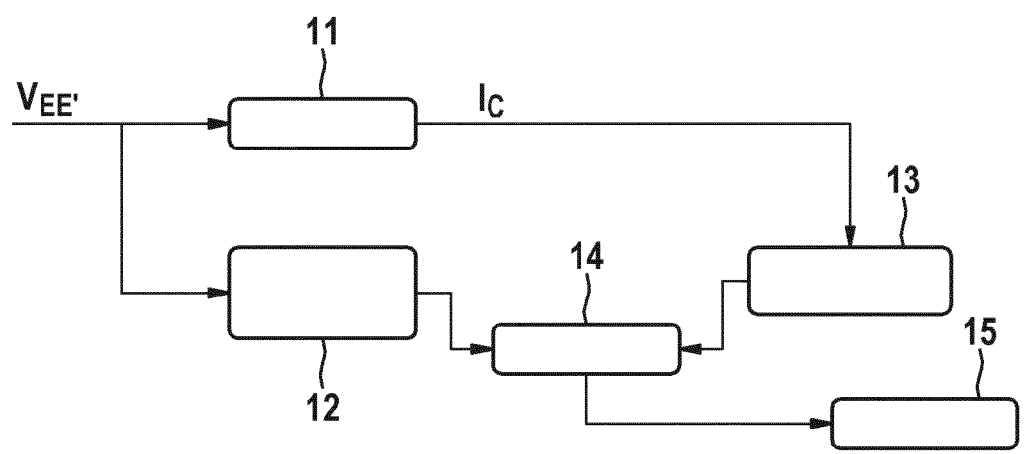
FIG. 8 shows a block diagram illustrating the function of an apparatus for estimating the junction temperature of an IGBT device.

In FIG. 8, a block diagram for the simultaneous estimation of the collector current $I_C$ and the junction temperature from the emitter voltage drop $V_{EE'}$ across the parasitic inductance is shown. FIG. 8 illustrates the measurement circuit 10, wherein the emitter voltage drop $V_{EE'}$ between the main emitter voltage $V_E$ and the auxiliary emitter voltage $V_{E'}$ is tapped and a corresponding emitter voltage drop $V_{EE'}$ is simultaneously supplied to an integrator 11 and a peak detector 12. From the integrator 11, a collector current $I_C$ is obtained according to the above formula, an indication of which is supplied to a first lookup function in a first lookup function block 13. In the first lookup function block 13, a reference peak voltage is determined using the thus obtained collector current $I_C$ and the collector emitter voltage which may substantially correspond to a DC link voltage $V_{DC}$. The reference peak voltage corresponds to a peak voltage that would be obtained at a reference junction temperature, which may be 25° C., at the respective collector current $I_C$ and the respective collector emitter voltage $V_{DC}$.

The peak detector 12 receives the emitter voltage drop $V_{EE'}$ across the parasitic inductance and detects a peak amplitude during a switching process in the IGBT device 2. The indication of the peak amplitude is provided to a comparator 14 together with the result of the reference peak voltage from the first lookup function block 13. The comparator 14 provides a voltage peak difference which is supplied to a second lookup function block 15. The second lookup function block 15 provides a second lookup function which associates the actual junction temperature $T_j$ of the IGBT device 2 with the collector current $I_C$, the collector emitter voltage $V_{DC}$ and the voltage peak difference with respect to the reference peak voltage.

The first lookup function can provide information regarding the peak voltage measured at a reference junction temperature and a peak voltage sensitivity (mV/° C.) at a particular collector current $I_C$ and collector emitter voltage $V_{DC}$ for various switching conditions. The difference in the peak voltage given by the comparator 14 can be used to estimate the junction temperature using the peak voltage sensitivity mV/° C. at a particular current and collector emitter voltage $V_{DC}$.

Figure 9:
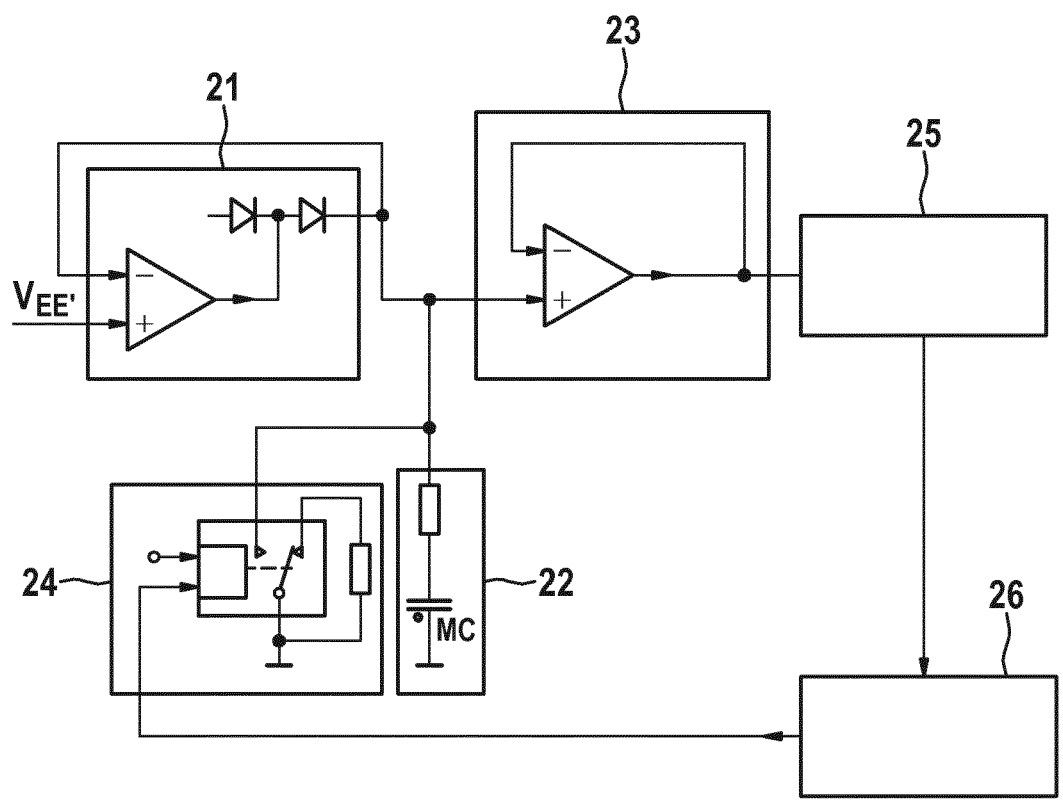
FIG. 9 shows a block diagram for an exemplary circuit implementation of a peak detector as used in the apparatus of FIG. 8.

FIG. 9 schematically shows a peak detector 12. The block diagram shows an active diode block 21, a purpose of which is to transmit the emitter voltage drop $V_{EE'}$ to a memory capacitance block 22 through a diode with a theoretical zero-voltage drop. The active diode block 21 also provides the loading current to the memory capacitance MC of the memory capacitance block 22. Due to the presence of the diode in the active diode block 21, the memory capacitance MC cannot discharge and retains the higher voltage. The active diode block 21 is configured to be fast enough in order to capture a small spike. After reading the memory capacitance MC with an output buffer unit 23, the memory capacitance MC is reset to an initial state by means of a reset unit 24.

The output of the output buffer unit 23 is fed to an analog-digital converter 25 to convert the buffer output into digital data. The digital data is processed in a processing unit 26 to control the reset unit 24 for resetting the memory capacitance MC.

The above apparatus allows for estimating the actual junction temperature $T_j$ of an IGBT device 2 by measuring electrical characteristics. The emitter voltage drop $V_{EE'}$ between the auxiliary emitter voltage $V_{E'}$ and the main emitter voltage $V_E$ during a turn-off of the IGBT device 2 is characterized with respect to its junction temperature $T_j$, its collector emitter voltage $V_{DC}$ and its collector current $I_C$, so that the voltage shift information of the peak voltage of the emitter voltage drop $V_{EE'}$ can be used together with a lookup function to obtain the actual junction temperature $T_j$. Furthermore, as the collector current $I_C$ is also required for estimating the junction temperature $T_j$, the values for the actual collector current $I_C$ and the junction temperature derived therefrom correspond to the same time instance, which allows for a more accurate estimation of the remaining lifetime of the IGBT device 2.

REFERENCE LIST

1 IGBT module
2 IGBT device
10 measurement circuit
11 integrator
12 peak detector
13 first lookup function block
14 comparator
15 second lookup function block
21 active diode block
22 memory capacitance block
23 output buffer unit
24 reset unit
25 analog-digital converter
26 processing unit

The invention claimed is:

1. A method for determining an actual junction temperature ($T_j$) of an IGBT device, wherein the IGBT device has a main emitter ($E_M$) and an auxiliary emitter ($E_A$), comprising the steps of:
measuring the characteristics of an emitter voltage drop ($V_{EE'}$) as a difference between a main emitter voltage ($V_E$) at the main emitter ($E_M$) and an auxiliary emitter voltage ($V_{E'}$) at the auxiliary emitter ($E_A$) during a switching operation of the IGBT device; and
determining the junction temperature based on the characteristics of the emitter voltage drop ($V_{EE'}$),
wherein the junction temperature ($T_j$) is determined by the steps of:
assigning a reference peak voltage of the emitter voltage drop ($V_{EE'}$) during the switching operation to a provided collector emitter voltage ($V_{DC}$) of the IGBT device and a determined collector current ($I_C$), wherein the reference peak voltage corresponds to a peak voltage of the emitter voltage drop ($V_{EE'}$) during a switching operation at a reference temperature;
determining a peak voltage of the emitter voltage drop ($V_{EE'}$) during the switching operation; and
determining the actual junction temperature ($T_j$) depending on the determined peak voltage and the reference peak voltage.

2. A method according to claim 1, wherein the peak voltage of the emitter voltage drop ($V_{EE'}$) is determined during the switching operation by loading a memory capacitance (MC) with a load current proportional to the emitter voltage drop ($V_{EE'}$) and providing the memory capacitance voltage as an indication of the peak voltage.

3. A method according to claim 1, wherein the actual junction temperature ($T_j$) is determined depending on a peak voltage difference between the determined peak voltage and the reference peak voltage and a sensitivity of the characteristics of the peak voltage over junction temperature of the IGBT device.

4. A method according to claim 1, wherein assigning the reference peak voltage is performed by a provided lookup function determining a relation between peak voltages at reference temperatures and collector currents ($I_C$).

5. A method according to claim 4, wherein the peak voltage of the emitter voltage drop ($V_{EE'}$) is determined during the switching operation by loading a memory capacitance (MC) with a load current proportional to the emitter voltage drop ($V_{EE'}$) and providing the memory capacitance voltage as an indication of the peak voltage.

6. A method according to claim 4, wherein the actual junction temperature ($T_j$) is determined depending on a peak voltage difference between the determined peak voltage and the reference peak voltage and a sensitivity of the characteristics of the peak voltage over junction temperature of the IGBT device.

7. A method according to claim 1, wherein the collector current ($I_C$) is determined based on an integration of the emitter voltage drop ($V_{EE'}$) over time during the switching operation.

8. A method according to claim 7, wherein assigning the reference peak voltage is performed by a provided lookup function determining a relation between peak voltages at reference temperatures and collector currents ($I_C$).

9. A method according to claim 7, wherein the peak voltage of the emitter voltage drop ($V_{EE'}$) is determined during the switching operation by loading a memory capacitance (MC) with a load current proportional to the emitter voltage drop ($V_{EE'}$) and providing the memory capacitance voltage as an indication of the peak voltage.

10. A method according to claim 7, wherein the actual junction temperature ($T_j$) is determined depending on a peak voltage difference between the determined peak voltage and the reference peak voltage and a sensitivity of the characteristics of the peak voltage over junction temperature of the IGBT device.

11. An apparatus for determining an actual junction temperature ($T_j$) of an IGBT device, wherein the IGBT device has a main emitter ($E_M$) and an auxiliary emitter ($E_A$), characterized by:
means for measuring the characteristics of an emitter voltage drop ($V_{EE'}$) as a difference between a main emitter voltage ($V_E$) at the main emitter ($E_M$) and an auxiliary emitter voltage ($V_{E'}$) at the auxiliary emitter ($E_A$) during a switching operation of the IGBT device; and means for determining the junction temperature based on the characteristics of the emitter voltage drop ($V_{EE'}$), a first lookup function block for assigning a reference peak voltage of the emitter voltage drop ($V_{EE'}$) during the switching operation to a provided collector emitter voltage ($V_{DC}$) of the IGBT device and a determined collector current ($I_C$), wherein the reference peak voltage corresponds to a peak voltage of the emitter voltage drop ($V_{EE'}$) during a switching operation at a reference temperature and;

a second lookup function block for determining the actual junction temperature ($T_j$) depending on a determined peak voltage and the reference peak voltage.

12. An apparatus according to claims 11, wherein a comparator is provided which is configured to provide a voltage peak difference which is supplied to the second lookup function block.

13. An apparatus according to claim 11, wherein an integrator is provided which is configured to determine the collector current ($I_C$) based on an integration of the emitter voltage drop ($V_{EE'}$) over time during the switching operation.

14. An apparatus according to claim 13, wherein a comparator is provided which is configured to provide a voltage peak difference which is supplied to the second lookup function block.

15. An apparatus according to claim 13, wherein the integrator comprises an active diode block and a memory capacitance block, wherein the active diode block, transmits the emitter voltage drop ($V_{EE'}$) to the memory capacitance block through a diode with a theoretical zero-voltage drop.

16. An apparatus according to claim 11, wherein a peak voltage detector is provided which is configured to determine the peak voltage of the emitter voltage drop ($V_{EE'}$) during the switching operation.

17. An apparatus according to claim 16, wherein the integrator comprises an active diode block and a memory capacitance block, wherein the active diode block transmits the emitter voltage drop ($V_{EE'}$) to the memory capacitance block through a diode with a theoretical zero-voltage drop.

18. An apparatus according to claim 16, wherein an integrator is provided which is configured to determine the collector current ($I_C$) based on an integration of the emitter voltage drop ($V_{EE'}$) over time during the switching operation.

19. An apparatus according to claim 16, wherein a comparator is provided which is configured to provide a voltage peak difference which is supplied to the second lockup function block.

* * * * *